United States Patent
Naae et al.

(10) Patent No.: US 10,501,677 B2
(45) Date of Patent: Dec. 10, 2019

(54) SURFACTANT COMPOSITIONS

(71) Applicant: Chevron U.S.A. Inc., San Ramon, CA (US)

(72) Inventors: Douglas G. Naae, Sugar Land, TX (US); Gregory A. Winslow, Houston, TX (US); Varadarajan Dwarakanath, Houston, TX (US); Taimur Malik, Houston, TX (US); Gayani Pinnawala Arachchilage, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/666,686

(22) Filed: Aug. 2, 2017

(65) Prior Publication Data

US 2018/0037794 A1    Feb. 8, 2018

Related U.S. Application Data

(60) Provisional application No. 62/369,822, filed on Aug. 2, 2016.

(51) Int. Cl.
| | | |
|---|---|---|
| *C09K 8/20* | (2006.01) | |
| *C09K 8/60* | (2006.01) | |
| *C09K 8/524* | (2006.01) | |
| *C09K 8/584* | (2006.01) | |
| *C08G 65/26* | (2006.01) | |
| *C08K 5/057* | (2006.01) | |

(52) U.S. Cl.
CPC ............ *C09K 8/20* (2013.01); *C08G 65/2612* (2013.01); *C09K 8/524* (2013.01); *C09K 8/584* (2013.01); *C09K 8/604* (2013.01); *C08G 65/2606* (2013.01); *C08K 5/057* (2013.01)

(58) Field of Classification Search
CPC .......... C08K 8/035; C08K 8/04; C09K 8/035; C09K 8/04
See application file for complete search history.

(56) References Cited

U.S. PATENT DOCUMENTS

| | | | |
|---|---|---|---|
| 4,739,040 A * | 4/1988 | Naae | B01F 17/0028 530/500 |
| 4,775,653 A | 10/1988 | Leach et al. | |
| 4,781,251 A * | 11/1988 | Naae | C08H 6/00 166/270.1 |
| 4,787,454 A * | 11/1988 | Naae | B01F 17/0028 166/270.1 |
| 5,027,898 A | 7/1991 | Naae | |
| 5,035,288 A * | 7/1991 | Kieke | B01F 17/0085 166/270.1 |
| 5,094,295 A * | 3/1992 | Morrow | C08H 6/00 166/270.1 |
| 5,095,985 A * | 3/1992 | Naae | C08H 6/00 166/270.1 |
| 5,095,986 A * | 3/1992 | Naae | C08H 6/00 166/270.1 |
| 5,230,814 A * | 7/1993 | Naae | C09K 8/584 166/270.1 |
| 5,233,087 A | 8/1993 | Cripe | |
| 6,100,385 A * | 8/2000 | Naae | C07G 1/00 530/502 |
| 2013/0212930 A1* | 8/2013 | Naae | C10B 53/02 44/307 |
| 2016/0168335 A1* | 6/2016 | Pober | C09K 8/035 530/500 |
| 2018/0037794 A1* | 2/2018 | Naae | C09K 8/524 |

OTHER PUBLICATIONS

Chen, Shuyan, et al.; "Synthesis of Surfactants from Alkali Lignin for Enhanced Oil Recovery"; Journal of Dispersion Science and Technology, (2016), vol. 37, No. 11, pp. 1574-1580.
International Search Report, dated Nov. 9, 2017, during the prosecution of International Application No. PCT/US2017/045074.
Written Opinion of the International Searching Authority, dated Nov. 9, 2017, during the prosecution of International Application No. PCT/US2017/045074.

* cited by examiner

*Primary Examiner* — Liam J Heincer

(57) ABSTRACT

Provided herein are novel surfactant compositions and methods having application in a variety of fields including enhanced oil recovery, the cleaning industry as well as groundwater remediation. The surfactant compositions are based on lignin bio-oil with a phenol hydroxyl group as the main functional group. The compositions include carboxylic surfactant s and mixed hydrophilic and hydrophobic surfactant structures, which can be used for the recovery of crude oil compositions from challenging reservoirs.

23 Claims, 5 Drawing Sheets

SURFACTANT COMPOSITIONS

CROSS-REFERENCE TO RELATED APPLICATIONS

This application claims the benefit of U.S. Provisional Patent Application No. 62/369,822, filed on Aug. 2, 2016, which is incorporated herein by reference in its entirety.

TECHNICAL FIELD

The disclosure relates generally to surfactant compositions and methods for making thereof, for use in enhanced oil recovery, cleaning, and groundwater remediation applications.

BACKGROUND

Enhanced oil recovery (EOR) refers to techniques for increasing the amount of petroleum which can be produced from an oil reservoir. Water injection or waterflooding has been used as a method for reservoir management, helping to maintain reservoir pressure and enhance production of hydrocarbon reserves. Because of the structure of the reservoir and relative inter-facial tensions involved, the flood water may form channels or fingers, bypassing the oil in the formation. Even where water has flowed, residual oil is trapped in pores by viscous and capillary forces. Further flooding with water will not remove such oil.

Surfactant flooding to recover oil has been actively investigated due to the relatively poor ability of water floods to displace remaining oil from a reservoir's pore structure. The use of surfactants has been limited due to both availability (including relatively complex manufacturing processes) and high cost of the surfactants. This makes surfactant flooding systems for oil recovery generally expensive with high front end cost loads.

Surfactant compositions for use in the prior art employed a petroleum sulfonate as either the sole surfactant, or at least a major component of a mixture of surfactants. Synthetic alkyl benzene sulfonates, alkyl sulfonates and sulfates have also been used as oil recovery surfactants. To combat separation problems in surfactant mixtures, especially at high salinities (>2% salt), a surfactant with both water soluble and oil soluble characteristics was often added to sulfonate surfactant mixtures. These materials were referred to as "solubilizers" and were usually sulfate or sulfonate salts of polyethoxylated alcohols or alkylphenols.

Conversion of lignin, i.e., wood based materials, into surfactants by reduction reactions and their use in chemical flood systems in EOR has been described in U.S. Pat. Nos. 4,739,040, and 6,100,385, incorporated herein by reference. The methods consist of reducing the lignin into a lignin bio-oil which is a complex product mixture of phenols. The lignin bio-oil can then be modified chemically to form water soluble surfactants by one or a combination of several chemical reactions such as alkoxylation, alkylation, sulfonation, sulfation, and sulfomethylation. Other chemical modifications have been developed to modify the surfactant properties of the lignin bio-oil surfactants, as disclosed in U.S. Pat. Nos. 5,095,985; 5,095,986; 5,230,814; and 5,035,288, also incorporated herein by reference.

There is still a need for improved methods for making surfactant compositions based on natural resources such as wood and plants, and improved surfactant compositions derived from such natural resources.

SUMMARY OF THE INVENTION

A general embodiment of the disclosure is a method of producing an amphiphile from lignin, also referred to herein as a lignin amphiphile. In one example, the method comprises: providing a lignin phenol characterized as having an oxygen content of <=7%, a phenolic to carboxylic ratio ranging from 90:10 to 98:2, and an average molecular weight ranging from 150 to 450, and wherein the lignin phenol is produced in a reduction reaction at a hydrogen partial pressure from about 3.4 MPa (500 psig) to about 15 MPa (2200 psig); and converting the lignin phenol into a lignin amphiphile in one or more reactions of alkoxylation, alkylation, sulfonation, sulfation, alkoxysulfation, sulfomethylation, sulfoalkylation carboxylation, carboxymethylation or carboxyalkylation. The phenolic to carboxylic ratio ranges can be from 90:10 to 99:1. In one embodiment, the phenolic to carboxylic ratio can be between 90:10 and 98:2, or between 95:2 and 98:2. In some embodiments, there is between 0.01% and 7% oxygen. In some embodiments, there are between 0.01% and 6%, 0.01% and 5.8%, 0.01% and 5% oxygen content. The lignin phenol can be produced in a reduction reaction in the presence of a catalyst of iron oxides; iron sulfides; supported iron oxide catalysts; iron hydroxides mixed with sulfur, inorganic sulfur compounds and organic sulfur compounds; or combinations thereof. In an embodiment, the lignin phenol is produced in a reduction reaction in the presence of a reducing agents such as carbon monoxide, hydrogen, hydrogen sulfide and combinations thereof. The lignin amphiphile can be a co-solvent or a surfactant. Another general embodiment is a surfactant composition made according to the forgoing, wherein the surfactant composition has an interfacial tension of less than about 600 mdynes/cm, such as between 10 and 600 mdynes/cm, measured as 2% by weight solution in a brine having a content of about 35,000 ppm TDS against a crude oil having an average API gravity of from about 33 to 36 degrees.

A general embodiment of the disclosure is a method for enhancing oil recovery, comprising: (a) providing a wellbore in fluid communication with a subsurface reservoir containing hydrocarbons therewithin; (b) providing a lignin phenol characterized as having an oxygen content of <=7%, a phenolic to carboxylic ratio ranging from 90:10 to 98:2, and an average molecular weight ranging from 150 to 450, and wherein the lignin phenol is produced in a reduction reaction at a hydrogen partial pressure from about 3.4 MPa (500 psig) to about 15 MPa (2200 psig); (c) converting the lignin phenol into a lignin amphiphile in a reaction of alkoxylation, alkylation, sulfonation, sulfation, alkoxysulfation, sulfomethylation, sulfoalkylation carboxylation, carboxymethylation, carboxyalkylation, or combinations thereof; (d) forming an injection solution by mixing water with the lignin amphiphile; and (e) injecting the injection solution through the wellbore into the subsurface reservoir. The phenolic to carboxylic ratio ranges can be from 90:10 to 99:1. In one embodiment, the phenolic to carboxylic ratio can be between 90:10 and 98:2, or between 95:2 and 98:2. In some embodiments, there is between 0.01% and 7% oxygen. In some embodiments, there is between 0.01% and 6%, 0.01% and 5.8%, and 0.01% and 5% oxygen content. The lignin amphiphile can be a surfactant or a co-solvent. In one embodiment, one or more surfactants are added to the injection solution prior to injecting the injection solution through the wellbore into the subsurface reservoir. The injection solution can further comprise additional additives, such as surfactants, co-surfactants, co-solvents, and the like. Embodiments of the disclosure can additionally include a polymer.

Another general embodiment of the disclosure is a lignin amphiphile comprising a lipophilic portion of the lignin amphiphile comprising a lignin characterized as having an oxygen content of <=7%, a phenolic to carboxylic ratio ranging from 90:10 to 99:1, and an average molecular weight ranging from 150 to 450; and a hydrophilic portion of the lignin amphiphile comprising the general formula: $O\text{-}EO_w\text{---}(CH_2\text{---}CH(R)\text{---}O)_x\text{-}EO_w\text{---}PO_y\text{-}EO_z\text{---}X(Y)_a M^{b+}$, wherein EO corresponds to a ethoxy group, w is an integer from 0 to 25, wherein $-(CH_2\text{---}CH(R)\text{---}O)$ corresponds to an alkylates group, R in any alkyl group independently has a carbon number being an integer of 2-20, wherein PO corresponds to a propoxy group, y is an integer from 0 to 50, z is an integer from 0 to 70, wherein X is selected from a single bond, an alkylene group with 1 to 10 carbon atoms or an alkenylene group with 2 to 10 carbon atoms, wherein Y is an anionic group selected from the group of hydroxy groups, sulfate groups, sulfonate groups, carboxylate groups, phosphate groups or phosphonate groups, wherein M is selected from the group consisting of $H^+$, $Na^+$, $K^+$, $Li^+$, $Mg^+$, $Ca^{2+}$, and $NH^{4+}$, wherein a corresponds to an integer from 1 or 3, and wherein b corresponds to an integer from 1 to 3. In embodiments of the disclosure, Y could be a single hydroxy group. In some embodiments of the disclosure, the amphiphile is a multi-sulfonate, multi-carboxylate, sulfate, carboxylate, or sulfonate. In some embodiments, the amphiphile is non-ionic. In some embodiments, the amphiphile is anionic. In embodiments of the disclosure, the charge $M^{b+}$ is the opposite of the charge of $(Y)_a$.

BRIEF DESCRIPTION OF THE DRAWINGS

The drawings illustrate only example embodiments of methods, compositions, and data for different lignin bio-oil ("LBO") compositions and should not to be considered limiting of its scope, as different compositions may admit to other equally effective embodiments.

DETAILED DESCRIPTION

Figure 1:
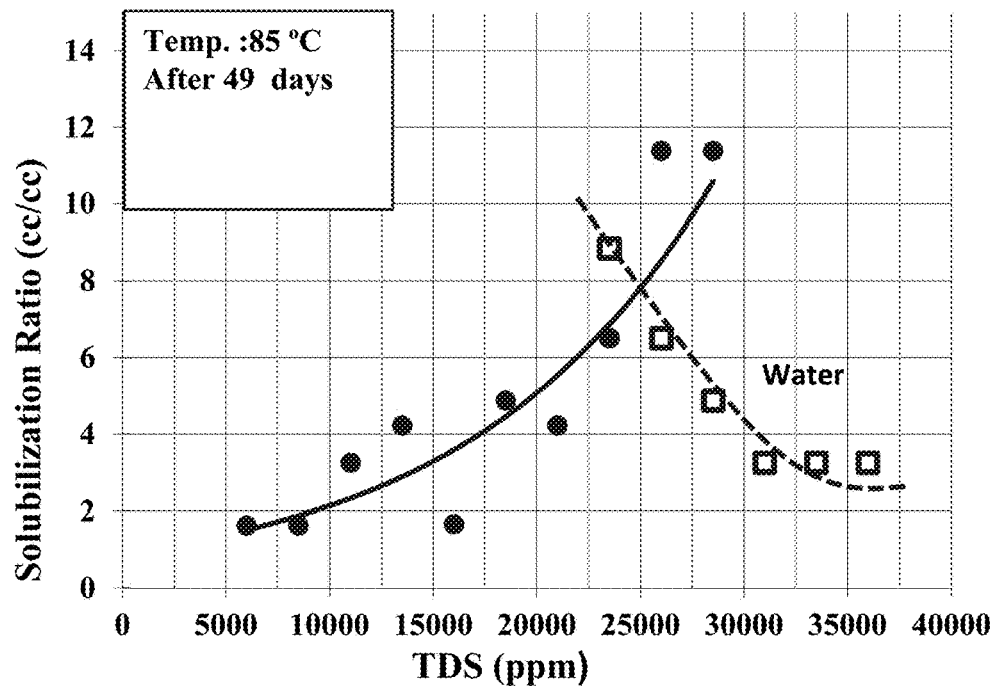
FIG. 1 is a solubilization plot for 0.5% C28-35PO-10EO-carboxylate, 0.5% isomerized olefin sulfonate, 0.5% LBO-9PO-Sulfate, and 0.29% ethylene glycol mono butyl ether ("EGBE").
Figure 2:
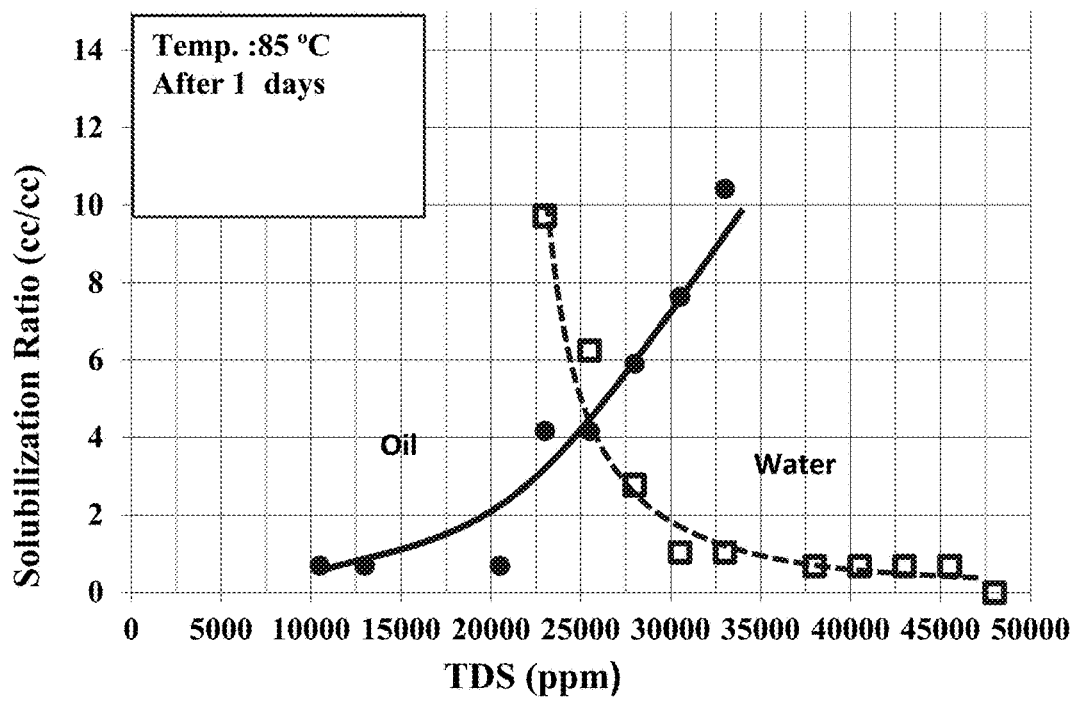
FIG. 2 is a solubilization plot for 0.5% C28-35PO-10EO-carboxylate, 0.5% isomerized olefin sulfonate, 1% LBO-10EO, and 0.29% EGBE.
Figure 3:
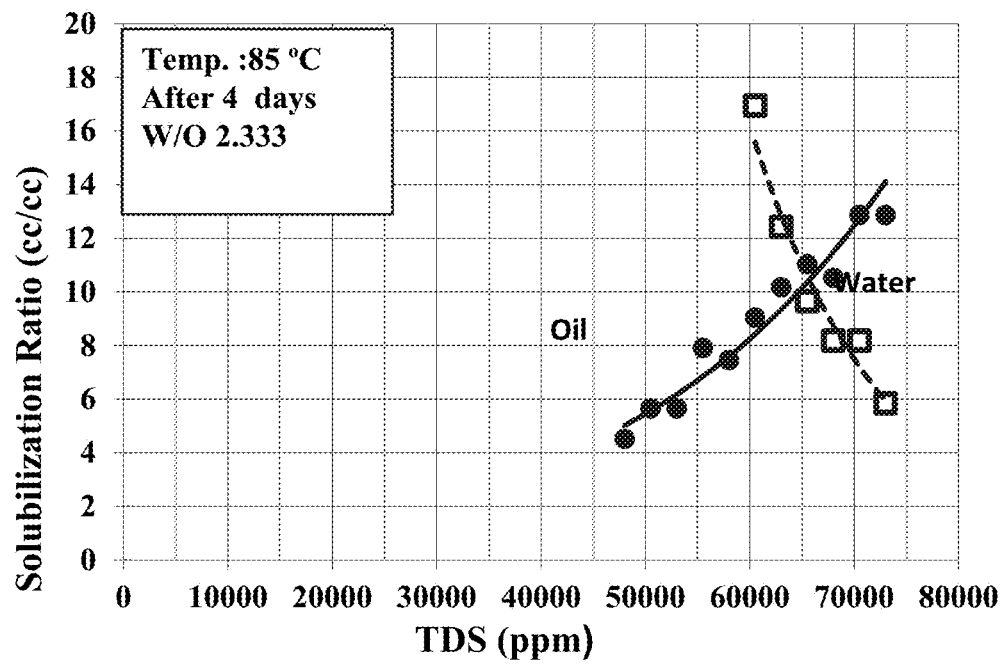
FIG. 3 is a solubilization plot for 0.5% C28-35PO-10EO-carboxylate, 0.5% isomerized olefin sulfonate, 1% LBO-9.6EO-Sulfate, and 0.29% EGBE.
Figure 4:
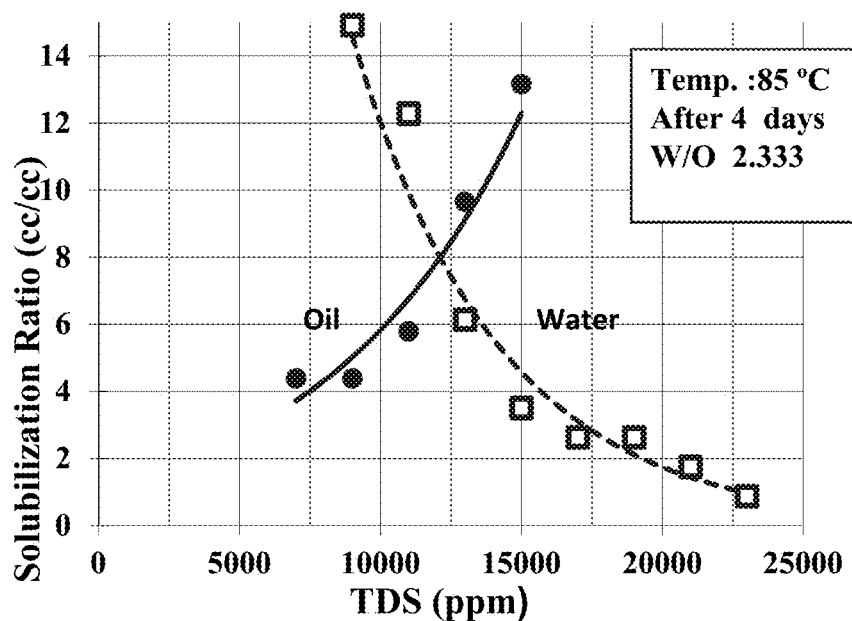
FIG. 4 is a solubilization plot for 1.5% alkyl aryl sulfonate, 0.5% isomerized olefin sulfonate, 1% LBO-10EO, 0.96% and EGBE.
Figure 5:
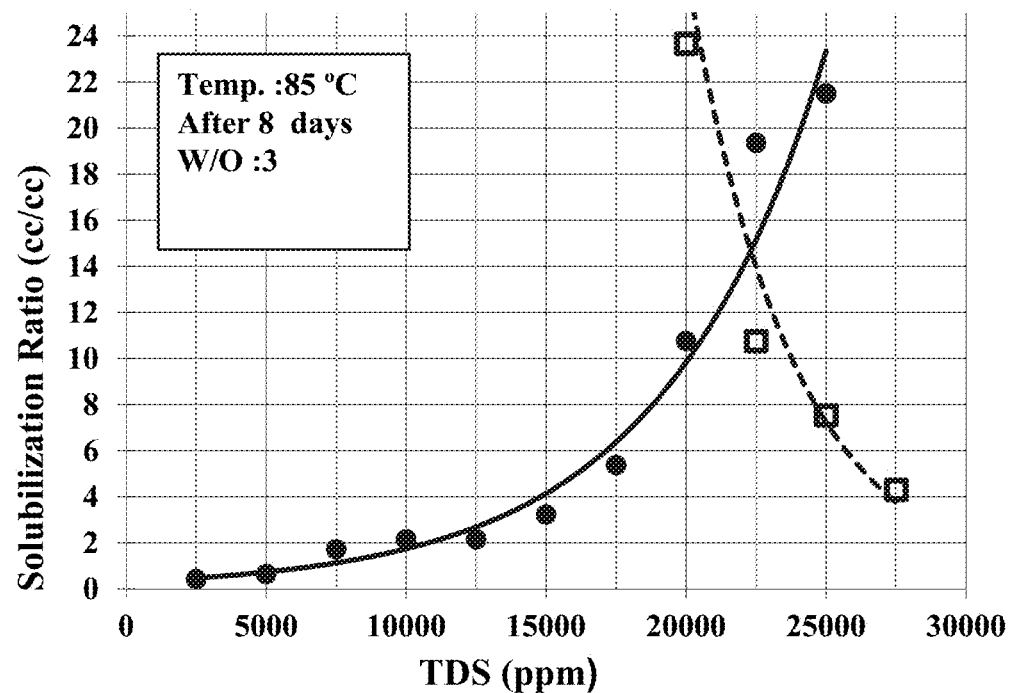
FIG. 5 is a solubilization plot for 0.75% C28-35PO-10EO-carboxylate, 0.75% isomerized olefin sulfonate, and 1% EGBE.

The following terms will be used throughout the specification and will have the following meanings unless otherwise indicated.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

"Amphiphile," as used herein, refers to a chemical compound with both hydrophilic and lipophilic properties. The hydrophilic portion of an amphiphile can be cationic, anionic, or neutral.

As used herein, "or ions thereof," when appended to a list of chemicals applies to any counter ions of any of the chemicals listed. For example, "hydrogen, a sulfate group, a sulfonate group, or ions thereof," refers to hydrogen, $-SO_3^-$, $-SO_2OH$, sulfonate salts such as $-SO_3Na$, $SO_3K$, $SO_3Li$, $SO_3NH_4$, $[-SO_3]_2Ca^{2+}$, or $[-SO_3]_2Mg^{2+}$, $-OSO_3^-$, $-OSO_2OH$, or sulfate salts such as $-OSO_3Na$, $OSO_3K$, $OSO_3Li$, $OSO_3NH_4$, or $[-OSO_3]_2Ca^{2+}$ or $[-OSO_3]_2Mg^{2+}$.

"Water," as used herein, includes any aqueous-based fluid, for example, seawater, produced water or other brine. The water can be treated or untreated.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Unless defined otherwise, all technical and scientific terms used herein have the same meanings as commonly understood by one of skill in the art to which the disclosed invention belongs.

"Lignin" refers to oligomeric and polymeric structures derived from wood and other plant sources and is an integral part of the cell walls of plants. Lignin is typically removed prior to the production of paper products or is a byproduct of other industries which involve the manipulation of plant material. In one embodiment, lignin is prepared in an alkaline air oxidation of a fermented spent-waste liquor from a sulfite pulp mill. The source of alkali is either sodium hydroxide or a combination of lime and soda ash which produces sodium hydroxide. The reactions are generally run at about 160° to about 175° C., at a pressure of about 150 to about 160 psig for about 2 hours. The lignin molecular structure is complex and random, comprising primarily substituted phenylpropane monomers polymerized in a seemingly random and unorganized fashion. Lignin structure may vary depending, for example, at least in part, on the plant source and isolation process.

"Average molecular weight" refers to the average molecular weight of the polymer chains in a polymer composition. Average molecular weight may be calculated as either the weight average molecular weight ("Mw") or the number average molecular weight ("Mn").

A "lignin amphiphile," as used herein, refers to a surfactant, co-surfactant, or co-solvent made from a LBO base.

In itself, lignin is one of the most abundant renewable materials on the planet. It has long been recognized as a potential feedstock for producing chemicals, fuels, and materials. However, it is a low value compound and has so far mainly been used as energy source in combustion applications. In one embodiment, the disclosure relates to lignin bio-oil compositions for use in making surfactants, and methods for making surfactants from the lignin bio-oil.

Lignin Bio-oils and Methods for Making: The lignin bio-oil for use in making lignin amphiphiles, such as surfactants is characterized with having a fairly broad average molecular weight range, e.g., 150 to 450+, having a single phenolic functional group, and with a chemical structure depicted as:

AR— represents the alkylated-and/or-aromatic substituted part of the lignin bio-oil structure which does not contain the phenol structure. In general, this part of the structure is composed only of carbon and hydrogen, with very low to negligible oxygen content. The —$C_6H_4$—OH portion of the structure depicts the phenolic part of the lignin bio-oil. The phenolic ring of the lignin bio-oil may contain one or two aryl or alkyl groups as substituents; though the above formula shows only one substituted group for simplicity.

The lignin bio-oils are characterized by high aromatic content with an easily accessible hydroxyl group (i.e., the phenolic —OH) for alkoxylation and various other functional group modifications of either the hydroxyl group or the aromatic rings, e.g., ethylene oxide (EO) and propylene oxide (PO) chains, alkylation, and either sulfonation, sulfation, or carboxylation of the either the lignin aromatic ring or the phenolic functional group. The lignin phenol oil of the disclosure is characterized by having an oxygen content of <=7% in one embodiment, <=6% in a second embodiment, and <=5.7% in a third embodiment. The lignin phenol oil is further characterized as having a phenolic to carboxylic ratio of at least 90:10 in one embodiment; ranging from 90:10 to 98:2 in a second embodiment; from 95:5 to 99:1 in a third embodiment, and greater than 99:1 in a fourth embodiment.

In one embodiments, the lignin phenol oil can be prepared in a method comprising mixing a cellulosic waste, or lignin, with a fluid carrier in the presence of a catalyst. The fluid carrier is used to help suspend the lignin (as a slurry) and facilitate contact between the lignin and a catalyst. In one embodiment, the fluid carrier is an aromatic refinery streams such as vacuum gas oils (VGO) or vacuum bottoms, oil obtained from the liquefaction of biomass (wood or lignin), recycled lignin phenol, organic solvents, or combinations thereof. In one embodiment of a process to prepare bio-oil from lignin, the lignin slurry is passed to a reactor pressurized with a hydrogen containing gas. The reactor can be a slurry bed reactor, a fluidized bed reactor, or any reactor that facilitates contact between the lignin and the catalyst in the reactor.

The reaction is operated at a hydrogen partial pressure from about 3.4 MPa (500 psig) to about 15 MPa (2200 psig) in one embodiment, and from 10 MPa (1500 psig) to about 13.5 MPa (2000 psig). Operating conditions include operating at a temperature between about 300° C. and 450° C. in one embodiment, and between 400° C. and 420° C. in a second embodiment. The catalyst is characterized as having a cracking function, which in one embodiment is zeolitic or amorphous silica-alumina catalyst or a combination of both with a metal deposited on the catalyst or catalysts. In another embodiment, the catalyst is iron oxides, iron sulfides, supported iron oxide catalysts, and iron hydroxides mixed with sulfur, inorganic sulfur compounds, organic sulfur compounds, or combinations thereof.

EOR Surfactants Prepared from Lignin Bio-Oils: A number of EOR surfactants can be prepared from the lignin bio-oils of the disclosure, including, for example: alkoxylates with the addition of repeating ethylene oxide (EO) units (ethoxylates) and propylene oxide (PO) units (Propoxylates), alkylates, and anionic surfactants such as sulfonates, and sulfates, and carboxylates. These and additional LBO surfactants are described throughout this disclosure.

Alkoxylates: In one embodiment, the EOR surfactants are of the mixed hydrophilic and hydrophobic surfactant structures—alkoxylated lignin oil surfactants, permitting better tuning and matching of reservoir properties and oil by the surfactant blends. Examples include ethoxylated and propoxylated phenols, and alkylated phenolic ethers from alpha olefin epoxides. The ethoxylated lignin oils are characterized as having excellent hydrophilic properties as surfactants for chemical EOR.

In one embodiment, the ethoxylates are generated by reaction with ethylene oxide, $C_2H_4O$ using either traditional catalysts, such as KOH, to produce a broad range of EO chain lengths. In another embodiment, the catalysts are selected from the group of Ca/Al alkoxide complexes, which produce significantly narrower distribution of EO chain lengths (i.e., 'peaking' catalysts), as disclosed in U.S. Pat. No. 4,775,653, incorporated herein by reference in its entirety. The chemical reaction is represented below, where the value of n for the EO chain length has a value of 1-70 in one embodiment, and from 5-40 in a second embodiment:

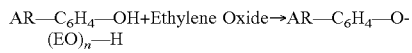
AR—$C_6H_4$—OH+Ethylene Oxide→AR—$C_6H_4$—O-(EO)$_n$—H

In another embodiment, the reaction with propylene oxide (PO), $C_3H_6O$, produces a propoxylated lignin bio-oil with enhanced hydrophobic properties when used as surfactants in chemical EOR. This reaction is depicted below, wherein the value of n for the PO chain length ranges from 5 to 50 in one embodiment, and from 20-40 in a second embodiment.

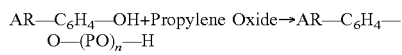
AR—$C_6H_4$—OH+Propylene Oxide→AR—$C_6H_4$—O—(PO)$_n$—H

In yet another embodiment, a surfactant is generated with a sequential combination of first PO addition to the lignin bio-oil, followed by a EO addition, for a surfactant with enhanced hydrophilic and hydrophobic characteristics. This sequential addition can also be accomplished by an initial reaction with EO to only incorporate a short EO chain. This initial product is reacted with PO, followed by EO addition to build the final product structure. The two product structure types are shown below where "n" can have integer values which range from 1 to 30 in one embodiment, from 20 to 50 in a second embodiment, at least 40 in a third embodiment, wherein the value of "a" is an integer less than 26, such as 0, 1, 2, 3, 4, . . . , 25 in the second structure, and wherein the value of "m" is less than 71, such as 0, 1, 2, 3, 4 . . . 70.

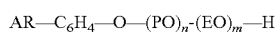
AR—$C_6H_4$—O—(PO)$_n$-(EO)$_m$—H

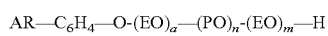
AR—$C_6H_4$—O-(EO)$_a$—(PO)$_n$-(EO)$_m$—H

Alkylates: In yet another embodiment, the surfactants prepared from the inventive lignin bio-oils contain a mixture of aromatic and alkylated hydrophobic structures, allowing for better tuning and matching of reservoir properties. In one embodiment of a process similar to a propoxylation reaction with propylene oxide, the base catalyzed reaction of the phenolic lignin bio-oil with an alpha olefin epoxide, as shown below, yields an alkylated oil product, where R is from alpha olefin epoxide where the Carbon number in R can be 2-20, straight chain or branched and Z=2-50. In some embodiments, EO(0-25) could be included prior to the adding in the alkylate. In some embodiments, after the below reaction, the molecule could be further modified as above to include EO(0-25):PO(0-50):EO(0-70).

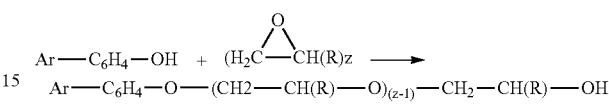

Surfactant products incorporating these alpha olefin epoxides are characterized as having excellent hydrophobic properties with various crude oil types due to the presence of significant aromatic and aliphatic content from the lignin and the alpha olefin.

Sulfonation: While typical sulfonation reactions on many aromatic compounds can be accomplished with either sulfuric acid, $H_2SO_4$, or with sulfur trioxide, $SO_3$, the phenolic aromatic ring in the lignin bio-oil is too reactive for these conventional sulfonation reactions. In addition, the lignin skeleton structure is susceptible to acid catalyzed condensation reactions, causing extensive cross-linking and polymerization of the oil and producing almost intractable solid tar. In one embodiment, the tarring reaction can be prevented by either diluting a conventional sulfonating reagent, e.g., sulfur trioxide, or by reducing the reactivity of the sulfur trioxide by complexing it with another reagent, such as p-dioxane. The complex formation method allows high conversion to the sulfonate and still limiting the amount of disulfonate products for lab scale reactions, as disclosed in U.S. Pat. Nos. 6,100,385 and 5,035,288, incorporated herein by reference:

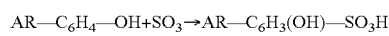
AR—$C_6H_4$—OH+$SO_3$→AR—$C_6H_3$(OH)—$SO_3H$

In one embodiment, the sulfonated lignin oil products are characterized has having variable positioning of the phenolic ring in each molecule. Additionally, as the oil is a varied mixture with a molecular weight range commonly not present in specialized surfactants, the sulfonated product retains the variable nature, yielding a surfactant with a broader range of activities and potential compositions.

Hydroxyl Sulfation: The hydroxyl group (—OH functional group) of the lignin bio-oil in one embodiment of the disclosure is readily sulfated either as the phenolic form or as the alcohol (e.g., formed in the ethoxylated products). The sulfation reaction with a reagent such as chlorosulfonic acid, Cl—$SO_3H$, or sulfamic acid, $H_2NSO_3H$, transforms the hydroxyl group to the corresponding sulfate ester, which is a very polar, hydrophilic group, as illustrated below giving an ethoxylated lignin oil.

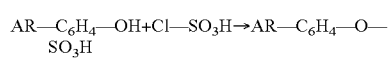
AR—$C_6H_4$—OH+Cl—$SO_3H$→AR—$C_6H_4$—O—$SO_3H$

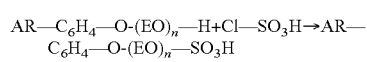
AR—$C_6H_4$—O-(EO)$_n$—H+Cl—$SO_3H$→AR—$C_6H_4$—O-(EO)$_n$—$SO_3H$

As shown, in the hydroxyl sulfation reaction, the hydrophilic sulfate group is placed at the end of a long EO or PO chain, distancing it from the hydrophobic lignin structure, and thereby ensuring a bi-polar structure, making it particularly suited for being an EOR surfactant. In yet another embodiment of a hydroxyl sulfation as described above, the terminal —OH group in either a phenol, or an alcohol (including EO and PO chains) can be converted to a substituted phenoxyl or alkoxyl carboxylate as disclosed in U.S. Pat. No. 5,233,087, incorporated herein by reference in its entirety.

Other Modifications: The surfactants prepared by either alkoxylation or alkylation of the lignin bio-oils can readily have their surfactant properties enhanced by the addition of strongly hydrophilic groups, as disclosed in U.S. Pat. No. 5,230,814, incorporated herein by reference.

In one embodiment, the alkylated products are modified to yield ethoxylated and propoxylated derivatives, which will further modify their performance. In yet another embodiment, an alkoxylated lignin phenol is sulfonated to transform the product into an oil soluble surfactant. In one embodiment, sulfonation is carried out by reacting the alkoxylated lignin phenol with the sulfur trioxide-dioxane complex (1:1) in a solvent such as 1,1,2-trichloroethane. Nitrobenzene, a standard sulfonation solvent, can also be employed instead of 1,1,2-trichloroethane.

In yet another embodiment, alkoxylated lignin phenols are sulfonated by sulfomethylation with formaldehyde and sodium sulfite or sodium bisulfite. The sulfomethylation reaction adds the sulfomethylene group (—CH$_2$SO$_3$Na) to the alkoxylated lignin phenol. Sulfuric acid and sulfur trioxide can also be used to sulfonate the alkoxylated lignin phenol.

In one embodiment, surfactants are prepared by an alkoxysulfation method to produce oil soluble surfactants having low interfacial tensions. The alkoxylated lignin phenols are first alkoxylated, preferably ethoxylated, and then sulfated. The chief location of alkoxylation is believed to be at the hydroxyl group on the alkyl chain with later sulfation at the end of the alkoxy chain. The alkoxysulfate chain in one embodiment has about 0.5 to about 5.0 ethylene oxide groups. In one embodiment, chlorosulfonic acid is employed for the sulfation reaction.

In one embodiment, a surfactant is prepared in a reaction of an ethoxylated lignin oil with chloroacetic acid and a base catalyst.

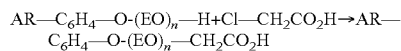
AR—C$_6$H$_4$—O-(EO)$_n$—H+Cl—CH$_2$CO$_2$H→AR—C$_6$H$_4$—O-(EO)$_n$—CH$_2$CO$_2$H Applications: The lignin amphiphiles, such as surfactants prepared from the lignin bio-oil are characterized as having an interfacial tension that is less than about 2500 mdynes/cm in one embodiment; less than about 600 mdynes/cm in a second embodiment, and less than about 300 mdynes/cm in a third embodiment. The interfacial tension is measured as 2% by weight solution in a brine having a content of about 35,000 ppm TDS against a crude oil having an average API gravity of from about 33 to 36 degrees.

The lignin amphiphiles, such as surfactants are particularly suitable for use in EOR applications. In one embodiment, the lignin amphiphiles, such as surfactants can be used to treat reservoirs having salinities of any of 200 ppm, 500 ppm, 1000 ppm, 5000 ppm, 10,000 ppm, 50,000 ppm, 100,000 ppm, 150,000 ppm, and 250,000 ppm, such as between 150-250,000 ppm, between 200-150,000 ppm, 500-100,000 ppm, or 1000-50,000 ppm. In another aspect, the composition is used to treat reservoirs with a hardness ion concentration of any of 200 ppm, 500 ppm, 1000 ppm, 5000 ppm, and 10,000 ppm, such as 200-10,000 ppm or 500-5000 ppm. In another aspect, the composition is thermally stable at temperatures of 200° C. or greater.

In one embodiment, the lignin amphiphiles, such as surfactants prepared from the lignin bio-oils are used in treating a hydrocarbon-bearing formation and/or a well bore, the term "treating" includes placing the surfactants in an aqueous stream within a hydrocarbon-bearing formation using any suitable manner known in the art (e.g., pumping, injecting, pouring, releasing, displacing, spotting, or circulating the surfactant into a well, well bore, or hydrocarbon-bearing formation). The lignin amphiphiles, such as surfactants can be injected into a reservoir to form a front, and optionally followed by the injection of additional brine or water which may contain a mobility control agent. The lignin amphiphiles, such as surfactant can be injected in an aqueous stream as a slug having about 10% to about 25% of the pore volume of the reservoir, with the surfactant(s) being employed in an amount ranging from 0.10 to 10 wt. % in one embodiment, from 0.25% to 7 wt. % in a second embodiment, and from 0.5 to 5 wt. % in a third embodiment.

In one embodiment, the lignin amphiphiles, such as surfactants can be used singly or blended with other surfactants (co-surfactants) for use in conventional chemical EOR. The co-surfactants can be employed in a concentration (as wt. % of the injected aqueous stream into the formation) ranging from 0.01 to 5 wt. %. Embodiments which blend co-surfactants include such surfactants as: anionic surfactants such as isomerized olefin sulfonates or internal olefin sulfonates (IOS), alfa olefin sulfonates (AOS), alkylaromatic sulfonates (Eg: Alkyl benzens sulfonates, ABS), alkyl aromatic disulfonates, alkyl sulfates, and alcohol ether carboxylates, alcohol ether sulfate, non-ionic surfactants such as alcohol ethers, polyalkylene alcohol ethers, polyalkylene glycols, alkyl polyglucosides, or other alcohol ethers with polymerized EO or PO/EO chains, for example.

In one embodiment, suitable co-solvents may be added to the lignin amphiphile blend in an amount ranging from 0.01 to 2%. Examples of co-solvents include TEGBE (triethylene glycol mono butyl ether), alcohols such as lower carbon chain alcohols like isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; or alcohol ethers.

In some embodiments, the lignin amphiphile, such as surfactant prepared from the lignin bio-oil is employed in an aqueous composition which further comprises a viscosity enhancing water-soluble polymer. In some embodiments, the water-soluble polymer may be a biopolymer such as xanthan gum or scleroglucan, a synthetic polymer such as polyacrylamide, hydrolyzed polyarcrylamide or co-polymers of acrylamide and acrylic acid, 2-acrylamido 2-methyl propane sulfonate or N-vinyl pyrrolidone, a synthetic polymer such as polyethylene oxide, or any other high molecular weight polymer soluble in water or brine. In some embodiments, the polymer is polyacrylamide (PAM), partially hydrolyzed polyacrylamides (HPAM), and copolymers of 2-acrylamido-2-methylpropane sulfonic acid or sodium salt or mixtures thereof, and polyacrylamide (PAM) commonly referred to as AMPS copolymer and mixtures of the copolymers thereof. Molecular weights of the polymers may range from about 10,000 daltons to about 20,000,000 daltons. In some embodiments, the viscosity enhancing water-soluble polymer is used in the range of about 500 to about 5000 ppm concentration, such as from about 1000 to 2000 ppm (e.g. in order to match or exceed the reservoir oil viscosity under the reservoir conditions of temperature and pressure).

In one embodiment, the lignin amphiphiles, such as surfactants can be used to improve the performance of hydraulic fracturing fluids. It is anticipated the addition of these new chemicals to hydraulic fracturing fluids will cause swelling and mobility improvement of kerogen and very heavy oils from oil shales. For instance, Type III kerogen from plant derived material retains more of the original aromatic character, thus resulting in it being more amenable for interaction with these new lignin oil surfactants.

In one embodiment, the lignin bio-oil is prepared as a co-solvent by the methods disclosed above. The co-solvent is used to increase the aqueous solubility of surfactants and/or enhance the phase behavior of a surfactant compositions such as fast equilibration, low microemulsion viscosity.

EXAMPLES

The following examples are given to illustrate the present disclosure. However, the disclosure is not limited to the specific conditions or details described in these examples.

Example 1

A lignin bio-oil is produced by hydrotreating an isolated lignin with hydrogen at about 2000 psig and about 420° C. and a suspended iron based catalyst, for elemental composition comprising: 83.47% carbon; 9.23% hydrogen; 1.19% nitrogen; 0.40% sulfur; 5.71% oxygen (by difference); <0.34% water. The properties are as follows: 6.26 API gravity and 1.027 Specific Gravity.

The number average molecular weight of the lignin bio-oil is about 229 g/mol as determined by vapor pressure osmometry. Mass spectral analysis reveals a broad molecular weight distribution from about 150 to 450+ for the oil. Non-aqueous potentiometric titration of the bio-oil shows about 3.05 milli-equivalents of titratable phenolic hydroxyl groups per gram of the oil, and about 0.059 milli-equivalents of titratable carboxylic acid per gram. Thus, 98% of the titratable hydroxyl groups are phenolic, and only 2% are carboxylic. The calculated equivalent weight of the lignin bio-oil is about 322 g/Eq.

Example 2

The sulfonation procedure involves the reaction of lignin bio-oil of Example 1 with a complex of sulfur trioxide and dioxane, generating lignin phenol sulfonates. The procedure is described in detail in U.S. Pat. No. 4,739,040, incorporated herein by reference.

Example 3

Lignin Bio-oil Based Co-solvent

A crude with a viscosity of 6.5 centipoise at 85 centigrade, an API gravity of 34 which was a waxy solid at room temperature was used as base crude oil for phase behavior experiments. The phase behavior was scanned using $Na_2CO_3$ and a base brine comprising NaCl, $Na_2SO_4$, $NaHCO_3$, KCl and DI water (Brine 1) or only $Na_2CO_3$ in DI water. Table 1 below lists the different compositions used. All samples equilibrated without a viscous phase. The lignin bio-oil was modified as a co-solvent as stated in the bio oil base component column.

TABLE 1

| Sample | Formulation | Bio oil base component | TDS (ppm) at optimum | SP* | IFT (mN/m) |
|---|---|---|---|---|---|
| 1 | 0.5% C28-35PO-10EO-carboxylate, 0.5% isomerized olefin sulfonate, 0.5% LBO-9PO-Sulfate 0.29% EGBE | LBO-9PO-sulfate | 25000 | 8 | 0.00468 |
| 2 | 0.5% C28-35PO-10EO-carboxylate, 0.5% isomerized olefin sulfonate 1% LBO-10EO 0.29% EGBE | LBO-10EO | 25000 | 4 | 0.01875 |
| 3 | 0.5% C28-35PO-10EO-carboxylate, 0.5% isomerized olefin sulfonate, 1% LBO-9.6EO-Sulfate 0.29% EGBE | LBO-19.6EO-Sulfate | 65000 | 10 | 0.003 |
| 4 | 1.5% alkyl aryl sulfonate, 0.5% isomerized olefin sulfonate, 1% LBO-10EO 0.96% EGBE | LBO-10EO | 9000 | 8 | 0.00468 |

When the LBO base co-solvent was included, the samples showed fast equilibration and the samples did not have a viscous emulsion. The control samples without the LBO based co-solvent did not equilibrate and had a viscous emulsion. FIGS. 1-4 are the solubilization plots for samples 1-4, respectively, when water to oil ratio is 3:1 (25% oil). This shows the modified LBO of the disclosure when sulfated, propoxylated, and/or ethoxylated created an effective co-solvent which enhanced the quality of phase behavior and reduced the time needed to equilibrate.

Example 4

Lignin Bio-oil Based Surfactant

A crude with a viscosity of 6.5 centipoise at 85 centigrade, an API gravity of 34 which was a waxy solid at room temperature was used as base crude oil for phase behavior experiments. The phase behavior was scanned using $Na_2CO_3$ and a base brine comprising NaCl, $Na_2SO_4$, $NaHCO_3$, KCl and DI water (Brine 1) or only $Na_2CO_3$ in DI water. Table 2 below lists the different compositions used. The lignin bio-oil base was ethoxylated after adding propylene oxide and then functionalized adding a sulfate group, sulfonate, or carboxylate group to make the surfactant.

TABLE 2

| Sample No. | Formulation | Bio oil base component | TDS (ppm) at optimum | SP* | IFT (mN/m) | comments |
|---|---|---|---|---|---|---|
| 5 | 0.75% C28-35PO-10EO-carboxylate, 0.75% isomerized olefin sulfonate, 1% EGBE | None | 22500 | 14 | 0.001530 | Higher optimum salinity |
| 6 | 0.75% C28-35PO-10EO-carboxylate, 0.75% isomerized olefin sulfonate, 0.75% LBO-Sulfonate, 1% EGBE | LBO-Sulfonate | 12500 | 10 | 0.003 | Lower the optimum salinity |
| 7 | 1.0% C28-35PO-10EO-carboxylate, 0.5% LBO-35PO-10EO-Carboxylate, 1% EGBE | LBO-35PO-10EO-Carboxylate | 20000 | 4 | 0.1875 | Equilibrated without viscous phase |
| 8 | 0.5% LBO-35PO-10EO-carboxylate, 1% isomerized olefin sulfonate 1% EGBE | LBO-35PO-10EO-Carboxylate | 42500 | 4 | 0.1875 | Equilibrated without viscous phase |
| 9 | 1.5% LBO-35PO-10EO-Sulfate, 0.5% isomerized olefin sulfonate, 1% EGBE | LBO-35PO-10EO-Carboxylate | 70000 | 6 | 0.00833 | Equilibrated without viscous phase |

Figure 6:
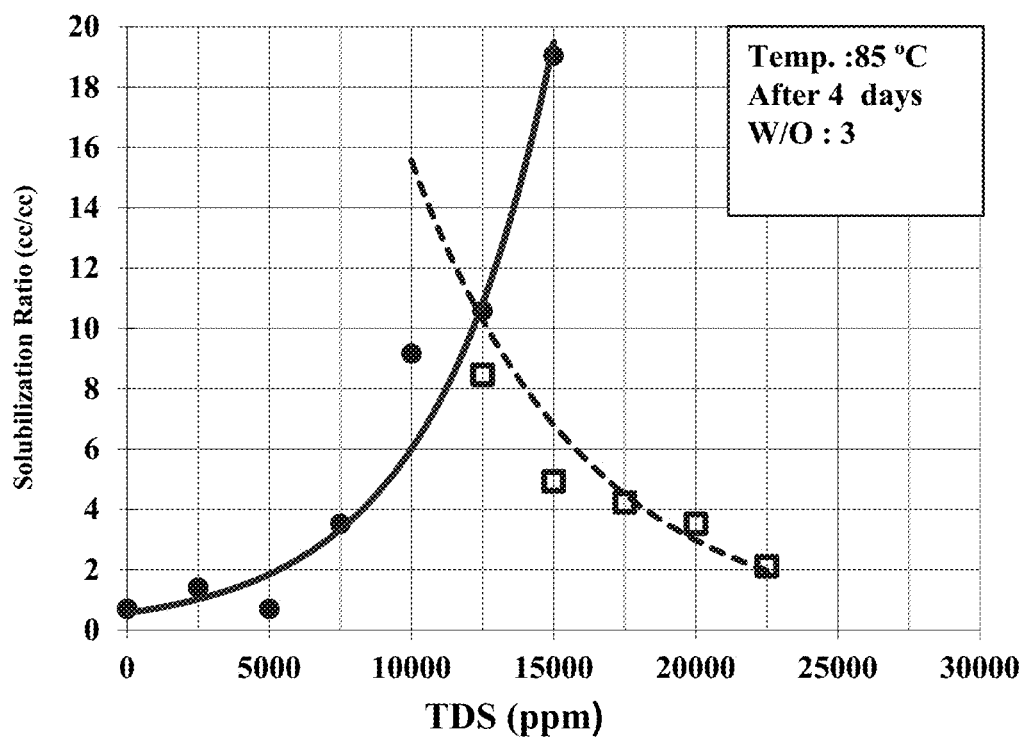
FIG. 6 is a solubilization plot for 0.75% C28-35PO-10EO-carboxylate, 0.75% isomerized olefin sulfonate, 0.75% LBO-Sulfonate, and 1% EGBE.
Figure 7:
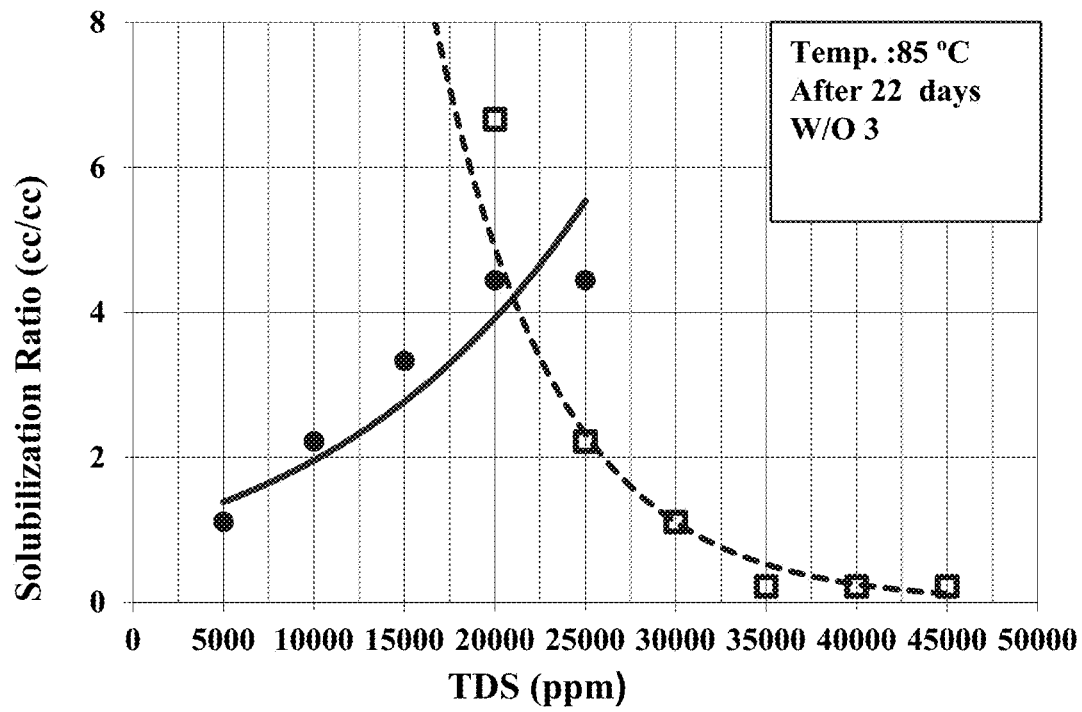
FIG. 7 is a solubilization plot for 1.0% C28-35PO-10EO-carboxylate, 0.5% LBO-35PO-10EO-Carboxylate, and 1% EGBE.
Figure 8:
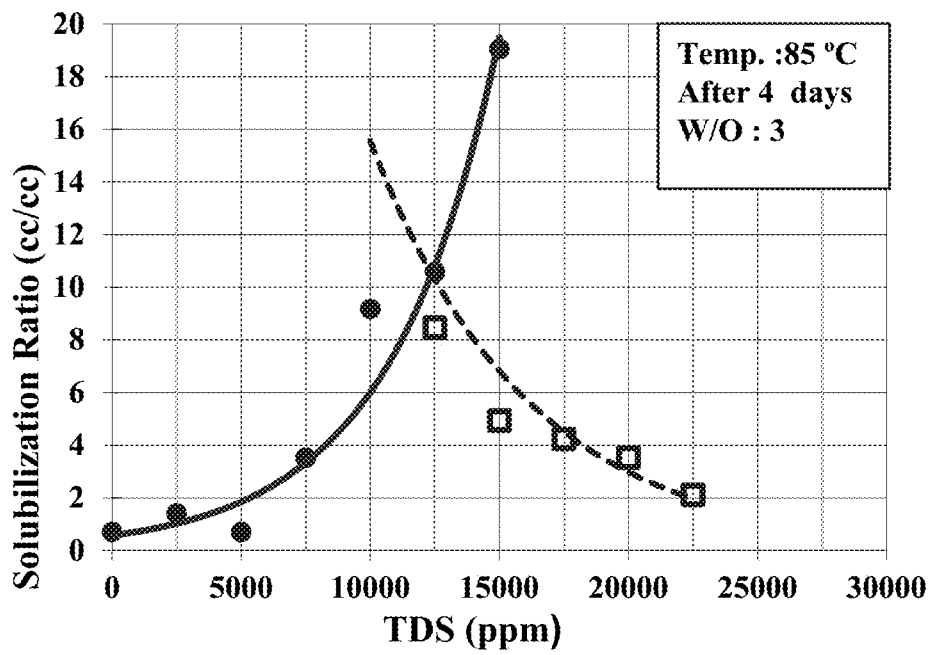
FIG. 8 is a solubilization plot for 0.5% LBO-35PO-10EO-carboxylate, 1% isomerized olefin sulfonate, and 1% EGBE.
Figure 9:
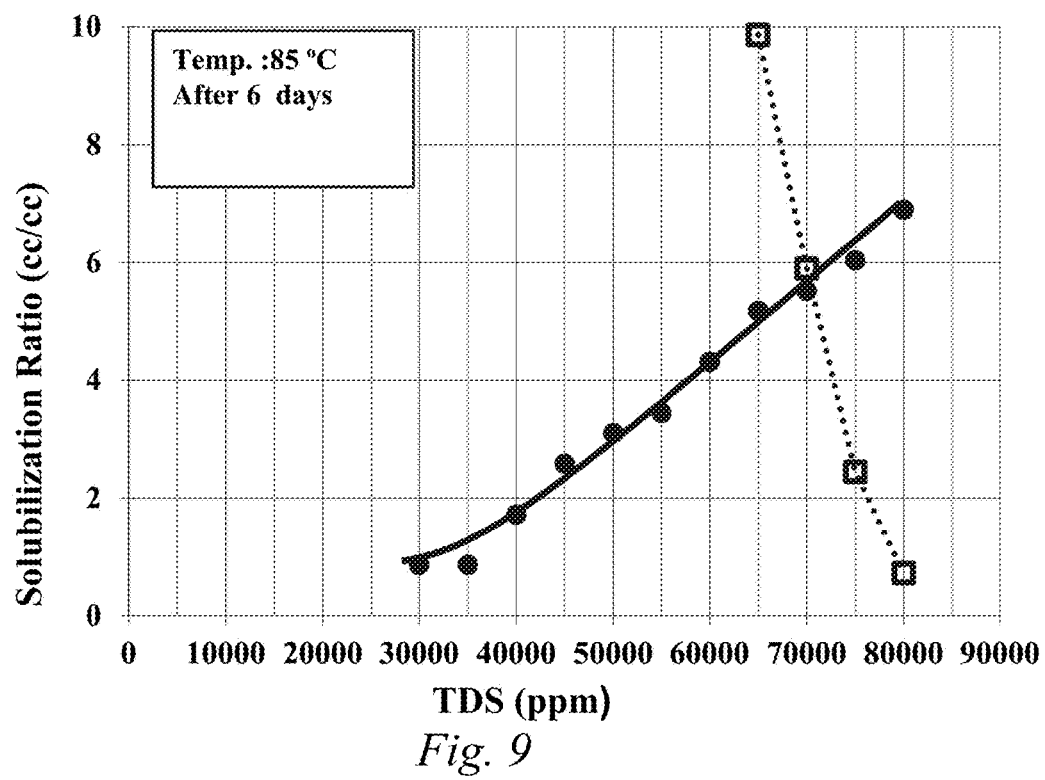
FIG. 9 is a solubilization plot for 1.5% LBO-35PO-10EO-Sulfate, 0.5% isomerized olefin sulfonate, and 1% EGBE.

FIGS. 5-9 are the solubilization plots for samples 5-9, respectively, when water to oil ratio is 3 (25% oil) except for Sample 9, which was carried out with water to oil ratio is 2.333 (30% crude oil). LBO-sulfonate was shown to decrease the optimum salinity (FIG. 6). LBO-xPO-yEO sulfate can be used to increase optimal salinity (FIG. 9). Further, LBO-xPO-yEO-sulfate and carboxylate was shown to act as a surfactant to obtain low interfacial tension.

The description and illustration of one or more embodiments provided in this application are not intended to limit or restrict the scope of the invention as claimed in any way. The embodiments, examples, and details provided in this disclosure are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope. For instance, such other examples are intended to be within the scope of the claims if they have structural or methodological elements that do not differ from the literal language of the claims, or if they include equivalent structural or methodological elements with insubstantial differences from the literal languages of the claims, etc. All citations referred herein are expressly incorporated by reference.

What is claimed is:

1. A lignin amphiphile comprising:
a lipophilic portion of the lignin amphiphile comprising a lignin phenol characterized as having an oxygen content of <=7%, a phenolic to carboxylic ratio ranging from 90:10 to 99:1, and an average molecular weight ranging from 150 to 450; and
a hydrophilic portion of the lignin amphiphile comprising the general formula:

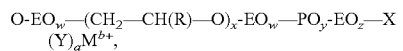

wherein EO corresponds to an ethoxy group,
w is an integer from 0 to 25,
wherein —(CH2—CH(R)—O) corresponds to an alkylates group,
R in any alkyl group that independently has a carbon number being an integer of 2-20,
wherein PO corresponds to a propoxy group,
y is an integer from 0 to 50,
z is an integer from 0 to 70,
wherein w+y+z is at least 40,
wherein X is selected from a single bond, an alkylene group with 1 to 10 carbon atoms or an alkenylene group with 2 to 10 carbon atoms,
wherein Y is an anionic group selected from the group of hydroxy groups, sulfate groups, sulfonate groups, carboxylate groups, phosphate groups or phosphonate groups, wherein M is selected from the group consisting of H⁺, Na⁺, K⁺, Li⁺, Mg⁺, Ca²⁺, and NH₄⁺, wherein a corresponds to an integer from 1 or 3, and wherein b corresponds to an integer from 1 to 3.

2. A method of producing a lignin amphiphile from lignin, the method comprising:
providing a lignin phenol characterized as having an oxygen content of <=7%, a phenolic to carboxylic ratio ranging from 90:10 to 99:1, and an average molecular weight ranging from 150 to 450, and wherein the lignin phenol is produced in a reduction reaction at a hydrogen partial pressure from about 3.4 MPa (500 psig) to about 15 MPa (2200 psig); and
converting the lignin phenol into the lignin amphiphile in one or more reactions of alkoxylation, alkylation, sulfonation, sulfation, alkoxysulfation, sulfomethylation, sulfoalkylation, carboxylation, carboxymethylation, carboxyalkylation, or combinations thereof, wherein the lignin amphiphile comprises at least 40 and less than 71 alkylene oxide units.

3. The method of claim 2, wherein the phenolic to carboxylic ratio ranges from 95:2 to 98:2.

4. The method of claim 2, wherein the phenolic to carboxylic ratio ranges from 90:10 to 98:2.

5. The method of claim 2, wherein the lignin phenol is produced in a reduction reaction in the presence of a catalyst of iron oxide; iron sulfides; supported iron oxide catalyst; and iron hydroxide mixed with sulfur, inorganic sulfur compound and organic sulfur compounds.

6. The method of claim 2, wherein the lignin phenol is produced in a reduction reaction in the presence of a reducing agent of carbon monoxide, hydrogen, hydrogen sulfide, or combinations thereof.

7. The method of claim 2, wherein the lignin amphiphile is a co-solvent.

8. The method of claim 2, wherein the lignin amphiphile is a surfactant.

9. The method of claim 2, wherein the alkylene oxide units comprise from 1 to 70 ethylene oxide units.

10. The method of claim 2, wherein the alkylene oxide units comprise from 1 to 50 propylene oxide units.

11. The method of claim 2, wherein the alkylene oxide units comprise 1 to 70 ethylene oxide units and 1 to 50 propylene oxide units.

12. The method of claim 2, wherein the lignin amphiphile comprises at least one carboxylate group.

13. A method for enhancing oil recovery, comprising:
(a) providing a wellbore in fluid communication with a subsurface reservoir containing hydrocarbons therewithin;
(b) providing a lignin amphiphile, wherein:
the lignin amphiphile was prepared via conversion of a lignin phenol in one or more reactions of alkoxylation, alkylation, sulfonation, sulfation, alkoxysulfation, sulfomethylation, sulfoalkylation, carboxylation, carboxymethylation, carboxyalkylation, or combinations thereof, and the lignin phenol is characterized as having an oxygen content of <=7%, a phenolic to carboxylic ratio ranging from 90:10 to 98:2, and an average molecular weight ranging from 150 to 450, and wherein the lignin phenol is produced in a reduction reaction at a hydrogen partial pressure from about 3.4 MPa (500 psig) to about 15 MPa (2200 psig), wherein the lignin amphiphile comprises at least 40 and less than 71 alkylene oxide units;
(c) forming an injection solution by mixing water with the lignin amphiphile; and
(d) injecting the injection solution through the wellbore into the subsurface reservoir.

14. The method for enhancing oil recovery of claim 13, wherein one or more surfactants are added to the injection solution prior to injecting the injection solution through the wellbore into the subsurface reservoir.

15. The method for enhancing oil recovery of claim 13, wherein the lignin amphiphile is a surfactant.

16. The method for enhancing oil recovery of claim 13, wherein the lignin amphiphile is a co-solvent.

17. The method for enhancing oil recovery of claim 13, wherein the injection solution further comprises one or more surfactants and one or more co-solvents.

18. The method for enhancing oil recovery of claim 13, wherein the injection solution further comprises one or more co-solvents.

19. The method for enhancing oil recovery of claim 13, wherein the hydrophilic portion of the lignin amphiphile comprises the general formula:

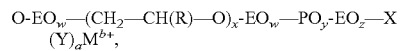

$$O\text{-}EO_w\text{---}(CH_2\text{---}CH(R)\text{---}O)_x\text{-}EO_w\text{---}PO_y\text{-}EO_z\text{---}X(Y)_a M^{b+},$$

wherein EO corresponds to an ethoxy group, w is an integer from 0 to 25, wherein —(CH2—CH(R)—O) corresponds to an alkylates group, R in any alkyl group independently has a carbon number being an integer of 2-20, wherein PO corresponds to a propoxy group, y is an integer from 0 to 50, z is an integer from 0 to 70, wherein X is selected from a single bond, an alkylene group with 1 to 10 carbon atoms or an alkenylene group with 2 to 10 carbon atoms, wherein Y is an anionic group selected from the group of hydroxy groups, sulfate groups, sulfonate groups, carboxylate groups, phosphate groups or phosphonate groups, wherein M is selected from the group consisting of H⁺, Na⁺, K⁺, Li⁺, Mg⁺, Ca²⁺, and NH₄⁺, wherein a corresponds to an integer from 1 or 3, and wherein b corresponds to an integer from 1 to 3.

20. The method of claim 13, wherein the alkylene oxide units comprise from 1 to 70 ethylene oxide units.

21. The method of claim 13, wherein the alkylene oxide units comprise from 1 to 50 propylene oxide units.

22. The method of claim 13, wherein the alkylene oxide units comprise 1 to 70 ethylene oxide units and 1 to 50 propylene oxide units.

23. The method of claim 13, wherein the lignin amphiphile comprises at least one carboxylate group.

* * * * *